United States Patent
Agarwal et al.

(10) Patent No.: US 7,992,055 B1
(45) Date of Patent: Aug. 2, 2011

(54) SYSTEM AND METHOD FOR PROVIDING AUTOSUPPORT FOR A SECURITY SYSTEM

(75) Inventors: Gaurav Agarwal, Sunnyvale, CA (US); Ryan Iwahashi, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 253 days.

(21) Appl. No.: 12/267,357

(22) Filed: Nov. 7, 2008

(51) Int. Cl.
*G06F 11/00* (2006.01)

(52) U.S. Cl. ............................................. 714/48; 714/25

(58) Field of Classification Search .................... 714/48
See application file for complete search history.

(56) References Cited

U.S. PATENT DOCUMENTS

| | | | |
|---|---|---|---|
| 5,247,664 A * | 9/1993 | Thompson et al. ................. 1/1 |
| 5,790,829 A * | 8/1998 | Flynn ............................... 703/17 |
| 5,819,292 A | 10/1998 | Hitz et al. |
| 6,502,166 B1 | 12/2002 | Cassidy |
| 6,564,252 B1 | 5/2003 | Hickman et al. |
| 6,671,773 B2 | 12/2003 | Kazar et al. |
| 7,159,093 B2 | 1/2007 | Dalal et al. |
| 7,185,144 B2 | 2/2007 | Corbett et al. |
| 7,302,520 B2 | 11/2007 | Kazar et al. |
| 7,343,529 B1 * | 3/2008 | Klinkner et al. ................. 714/57 |
| 7,353,217 B2 * | 4/2008 | Kosanovic et al. ............. 706/52 |
| 7,366,837 B2 | 4/2008 | Corbett et al. |
| 7,398,530 B1 * | 7/2008 | Parla et al. ..................... 719/318 |
| 7,409,494 B2 | 8/2008 | Edwards et al. |
| 7,716,176 B1 * | 5/2010 | Kandlikar et al. ............ 707/607 |
| 2002/0023113 A1 | 2/2002 | Hsing et al. |
| 2003/0188045 A1 | 10/2003 | Jacobson |
| 2004/0139167 A1 | 7/2004 | Edsall et al. |
| 2004/0148389 A1 * | 7/2004 | Satomi et al. ................. 709/224 |
| 2004/0153823 A1 * | 8/2004 | Ansari ............................. 714/38 |
| 2004/0155960 A1 | 8/2004 | Wren et al. |
| 2004/0205143 A1 | 10/2004 | Uemura |
| 2004/0225659 A1 * | 11/2004 | O'Brien et al. .................... 707/9 |
| 2005/0144173 A1 | 6/2005 | Yamamoto et al. |

(Continued)

FOREIGN PATENT DOCUMENTS

JP 10003440 6/1998

(Continued)

OTHER PUBLICATIONS

Brinkmann, A., et al., "Efficient, Distributed Data Placement Strategies for Storage Area Networks" XP-002404501, 10 pages.

(Continued)

*Primary Examiner* — Scott T Baderman
*Assistant Examiner* — Kamini Patel
(74) *Attorney, Agent, or Firm* — Cesari and McKenna, LLP

(57) ABSTRACT

A system and method for providing autosupport functionality to a security system is provided. An event generator generates an event and passes the newly generated event to a system log (syslog) module and marks the event as being associated with an autosupport facility. The syslog module then forwards the new event to an event router, which determines that the new event is associated with the autosupport facility and should be forwarded to an autosupport daemon. The autosupport daemon examines the current state of its queue and determines whether a free slot exists for the newly received event notification. Should no free slot exist, the autosupport daemon logs the event with no further action being performed. However, should a free slot exist, the autosupport daemon initiates a child process to notify a pre-configured set of recipients of the event.

18 Claims, 4 Drawing Sheets

U.S. PATENT DOCUMENTS

| | | | |
|---|---|---|---|
| 2005/0172162 A1* | 8/2005 | Takahashi et al. ............... | 714/4 |
| 2005/0192932 A1 | 9/2005 | Kazar et al. | |
| 2005/0278383 A1 | 12/2005 | Kazar et al. | |
| 2006/0179284 A1* | 8/2006 | Jensen et al. ................... | 712/219 |
| 2006/0248294 A1 | 11/2006 | Nedved et al. | |
| 2006/0271677 A1* | 11/2006 | Mercier ........................ | 709/224 |
| 2007/0006014 A1* | 1/2007 | Huang ............................. | 714/2 |
| 2007/0174580 A1* | 7/2007 | Shulga .......................... | 711/170 |
| 2007/0266128 A1* | 11/2007 | Bhogal et al. ................. | 709/223 |
| 2009/0106327 A1* | 4/2009 | Dilman et al. ................. | 707/202 |
| 2009/0106578 A1* | 4/2009 | Dilman et al. ................... | 714/2 |
| 2009/0106603 A1* | 4/2009 | Dilman et al. ................. | 714/42 |

FOREIGN PATENT DOCUMENTS

| | | |
|---|---|---|
| WO | WO 00/07101 | 2/2000 |

OTHER PUBLICATIONS

Clark, T. A., et al., "Using the ISIS Resource Manager for Distributed, Fault-Tolerant Computing", Proceedings of the 26$^{th}$ Hawaii International Conference on System Sciences (CAT. No. 93th0501-7), IEEE, Los Alamitos, CA, USA, 1993, pp. 257-265, vol. 1, XP010640439, ISBN: 0-8186-3230-5.

Ganger, Gregory R., et al., "Disk Subsystem Load Balancing: Disk Striping vs. Conventional Data Placement" Department of Electrical Engineering and Computer Science, University of Michigan, Ann Arbor, 10 pages.

Hartman, J. H., et al., "Zebra: A Striped Network File System" Proceedings of the Usenix File Systems Workshop, Apr. 1998 pp. 1-9, XP002926950.

Hartman, J. H., et al., "The Zebra Striped Network File System" Dec. 1, 1993, Operating Systems Review, ACM, New York, NY, US, pp. 29-43, XP000418681, Issn: 0163-5908.

Network Appliance, Inc., Notification of Transmittal of the International Search Report and the Written Opinion of the International Searching Authority, or the Declaration, International Application No. PCT/US2005/030889, International Filing Date: Aug. 31, 2005, Date of Mailing of Document: Jan. 13, 2006, 7 pages.

Network Appliance, Inc., Notification of Transmittal of the International Search Report and the Written Opinion of the International Searching Authority, or the Declaration, International Application No. PCT/US2006/016055, International Filing Date: Apr. 27, 2006, Date of Mailing of Document: Nov. 9, 2006, 10 pages.

Ho, T. K., et al., "A Row Permutated Data Reorganization Algorithm for Growing Server-Less Video-On-Demand Systems", Department of Information Engineering, The Chinese University of Hong Kong, Shatin, N.T., Hong Kong, May 12, 2003, 8 pages.

Honicky, R. J., et al., "A Fast Algorithm for Online Placement and Reorganization of Replicated Data", Storage Systems Research Center, University of California, Santa Cruz, Apr. 22, 2003, 10 pages.

Simitch, H., et al., "Adaptive disk striping for Parallel Input/output" Mass Storage Systems, 1999. 16th IEEE Symposium on San Diego, CA, USA, Mar. 15-18, 1999, Piscataway, NJ, USA, IEEE, US, Mar. 15, 1999, pp. 88-102, XP010376289.

Shinkai, E., et al., "HAMFS File System" Reliable distributed systems, 1999. Proceedings of the 18th IEEE Symposium on Lausanne, Switzerland, Oct. 19-22, 1999, Los Alamitos, CA, USA, IEEE Comput. Soc., US, Oct. 19, 1999, pp. 190-201, XP010356993.

\* cited by examiner

US 7,992,055 B1

SYSTEM AND METHOD FOR PROVIDING AUTOSUPPORT FOR A SECURITY SYSTEM

FIELD OF THE INVENTION

The present invention relates to security systems, and more specifically, to providing autosupport functionality for security systems.

BACKGROUND OF THE INVENTION

A network environment may be provided wherein information (data) is stored in secure storage served by one or more storage systems coupled to one or more security systems. Each security system is configured to transform unencrypted data (cleartext) generated by clients (or initiators) into encrypted data (ciphertext) destined for secure storage or "cryptainers" on the storage system (or target). As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a lun. In the context of a NAS environment, the cryptainer may be a collection of files on one or more disks. Specifically, in the context of the CIFS protocol, the cryptainer may be a share, while in the context of the NFS protocol, the cryptainer may be a mount point.

Each cryptainer is associated with its own encryption key, e.g., a cryptainer key, which is used by the security system to encrypt and decrypt the data stored on the cryptainer. An encryption key is a code or number which, when taken together with an encryption algorithm, defines a unique transformation used to encrypt or decrypt data. Data remains encrypted while stored in a cryptainer until requested by an authorized client. At that time, the security system retrieves the encrypted data from the cryptainer, decrypts it and forwards the unencrypted data to the client.

As can be appreciated, a security system is a complex combination of hardware modules, software modules, etc. The various modules comprising the security system may occasionally suffer from an error condition due to, e.g., hardware failures, data corruption, improper configuration, etc. The probability of suffering an error condition increases over time as changes occur to the installation site due to, e.g., upgrades, expansion of systems, etc. An error condition may occur due to, e.g., user error, incorrect cabling, software errors and/or hardware failures. In response to detection of error conditions, the software modules typically utilize a conventional system logging module to maintain a system log (syslog) of error conditions. Should a major failure occur and the administrator of the security system request help from the security system vendor, typically a member of the technical support staff will need to examine the syslog to identify error messages that are relevant to the failure and to identify the cause of the failure. The technical support staff member may be required to examine a plurality of syslog files to identify potential causes. As certain improper configurations may result in hundreds or thousands of messages being logged per minute, the time required to perform a manual review of the syslog file, identify the cause(s) of the condition and identify a solution may be substantial. Furthermore, during the examination of the syslog file, the security system may need to be deactivated, thereby causing undesirable down time of the security system, with concomitant loss of access to encrypted data and/or loss of (de)encryption bandwidth.

SUMMARY OF THE INVENTION

The disadvantages of the prior art are overcome by providing a system and method for providing autosupport functionality for one or more security systems in a network environment. By autosupport, it is generally meant the automatic notification of one or more individuals, including, e.g., system administrator and/or vendors, of an error condition or other event being generated by one or more modules of the security system. Automatic notification enables these administrator(s) and/or vendor(s) to identify a problem before it leads to a catastrophic failure of the system and/or data corruption/data loss. In operation, an event generator, which may be a software and/or hardware module executing on the security system, generates an event, e.g., an error condition. The event generator passes the generated event to a system log (syslog) module and marks the event as being associated with an autosupport facility of the syslog module. The syslog module then forwards the event to an event router, which, upon determining that the event is associated with the autosupport facility, forwards the event to an autosupport daemon as, e.g., an event notification. The autosupport daemon illustratively includes a plurality of slots in a queue for processing such event notifications. The autosupport daemon examines the current state of its queue and determines whether a free slot exists for the received event notification. Should no free slot exist, the autosupport daemon processes, e.g., logs, the event with no further action being performed. However, should a free slot exists, the autosupport daemon invokes a child process to notify a pre-configured set of recipients of the event. The recipients may include a vendor support system, a system administrator, a pager alert, etc. Once the recipients have been notified, the child process terminates and the slot in the queue is freed.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Security System Environment

Figure 1:
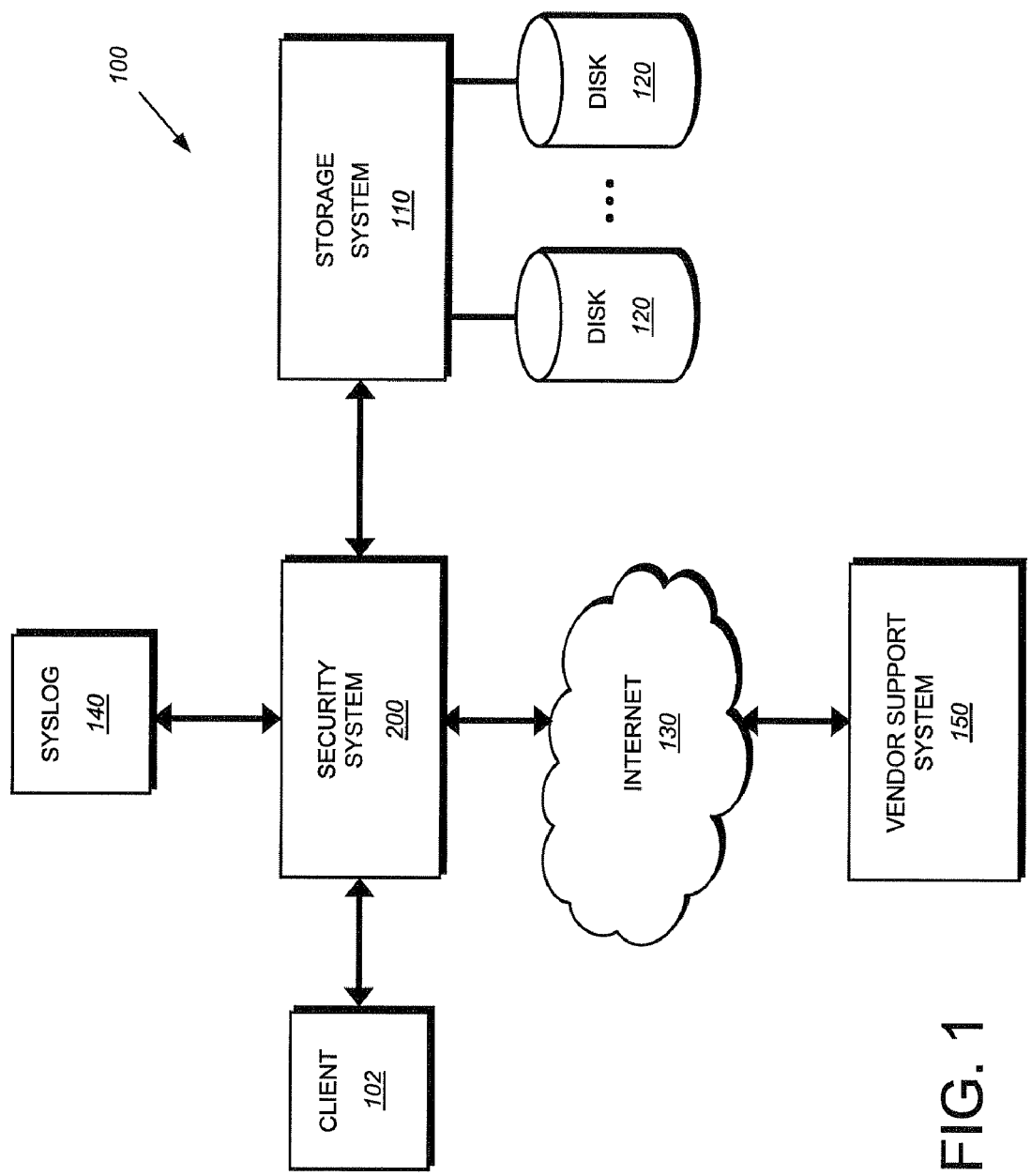
FIG. 1 is a schematic block diagram of a storage system environment including a security system in accordance with an illustrative embodiment of the present invention.

FIG. 1 is a schematic block diagram of storage system environment 100 including a security system 200 in accordance with an illustrative embodiment of the present invention. The security system 200 is coupled between one or more clients 102 and one or more storage systems 110. The security system 200, which is configured to act as an encryption proxy, intercepts a data access request issued by client 102 and destined for the storage system 110, wherein the data access request may be a read request to retrieve certain data stored on storage devices, such as disks 120, coupled to the storage system 110 or a write request to store data on the disks. In the case of a write request, the security system 200 intercepts the request, encrypts the data associated with the request and forwards the encrypted data to the storage system 110 for storage at a specified location (address) on disk 120. In the case of a read request, the security system intercepts the request and forwards it onto the storage system, which returns the requested data to the system in encrypted form. The security system 200 then decrypts the encrypted data and returns the decrypted data to the client 102.

In the illustrative embodiment, the security system employs a conventional encryption algorithm, e.g., the Advanced Encryption Standard (AES) or other appropriate algorithms, to transform unencrypted data (cleartext) generated by the clients 102 into encrypted data (ciphertext) intended for secure storage, i.e., one or more cryptainers, on the storage system 110. To that end, the security system illustratively uses a high-quality, software or hardware-based pseudo random number generation technique to generate encryption keys. The encryption and decryption operations are performed using these encryptions keys, such as a cryptainer key associated with each cryptainer. As described herein, the security system 200 uses an appropriate cryptainer key to encrypt or decrypt portions of data stored in a particular cryptainer. In addition to performing encryption and decryption operations, the security system 200 also performs access control, authentication, virtualization, and secure-logging operations.

Illustratively, a system log (syslog) system 140 may utilize a conventional syslog system, including external storage (not shown), for storing system log messages generated by the security system 200. The syslog system 140 illustratively comprises a separate computer dedicated to logging event messages. By separating the logging functionality from the security system 200, the probability of an error condition on the security system affecting the syslog is reduced. In alternative embodiments, the syslog system 140 may also log messages for other components of environment 100, including, e.g., for the storage system 110. It is expressly contemplated that environment 100 may be utilized without an external syslog module 140. In such alternative embodiments, an internal syslog module 255 (see FIG. 2) may be used in place of external syslog module 140 or no syslog module may be utilized within the environment. As such, the description of syslog module 140 should be taken as exemplary only.

The vendor support system 150 may be the recipient of a system/core dump from the security system 200 in the event of certain error conditions. Furthermore in accordance with the principles of the present invention, an autosupport daemon 265 (see FIG. 3) may send notices to the vendor support system 150 in response to certain error conditions.

It should be noted that the description of security systems should be taken as exemplary only. The principles of the present invention may be utilized in systems where encryption functionality is embedded into other systems within the environment. For example, encryption functionality may be included into a client 102 and/or a storage system 110 without the need for an intermediate security system 200. Furthermore, storage devices, such as disks 120, may include encryption functionality. As such, the description of a security system 200 performing encryption/decryption should be taken as exemplary only.

Furthermore, it should be noted that the principles or the present invention may be implemented in non-security system computer systems. As such, the description of security systems should be taken as exemplary only. That is, in alternative embodiments, the autosupport functionality described herein may be utilized in any computer environment including, e.g. storage systems, application servers, general purpose computers, etc. As such, the autosupport functionality of the present invention is expressly contemplated to be operable with systems other than security systems.

B. Security System

Figure 2:
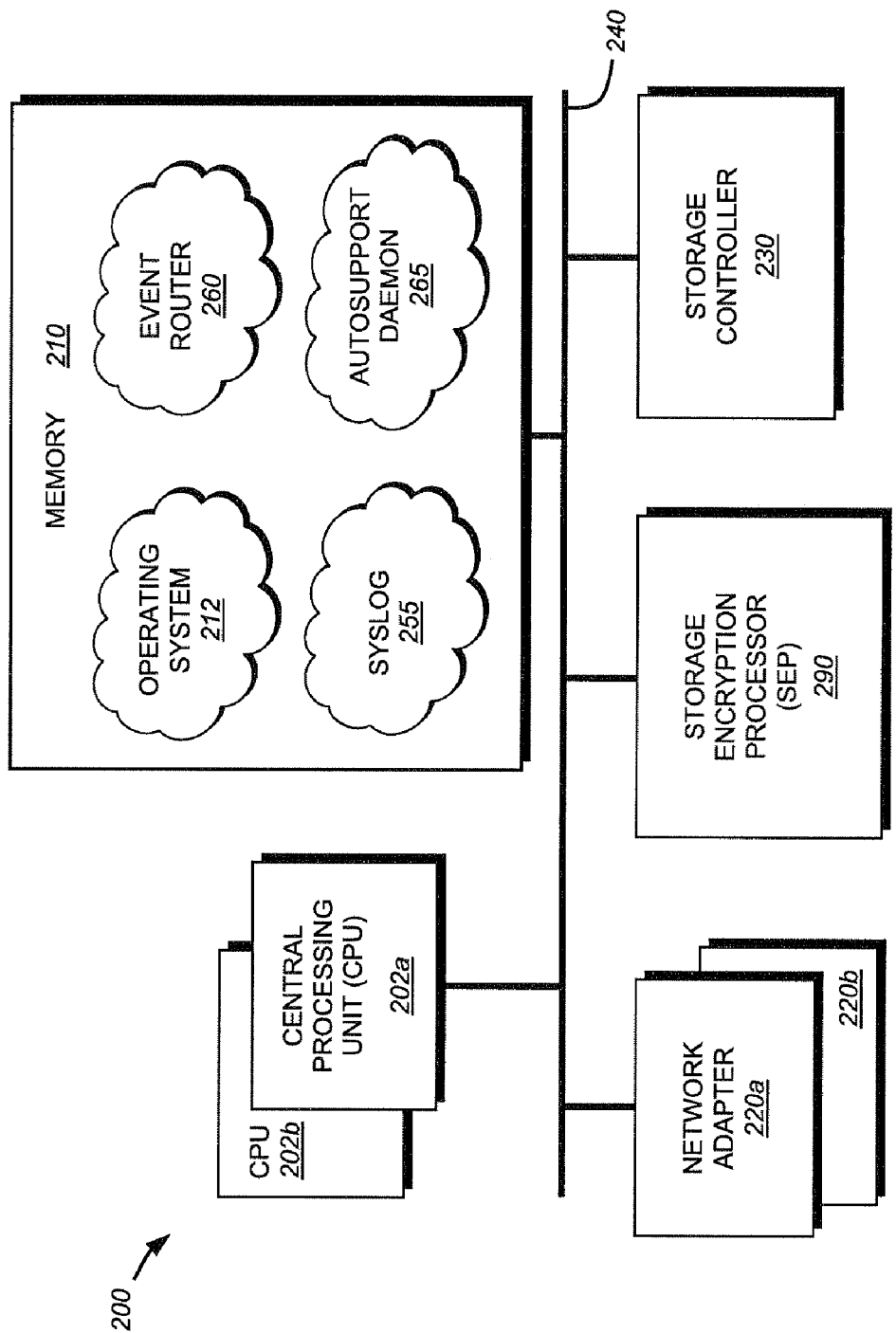
FIG. 2 is a schematic block diagram of a security system in accordance with an illustrative embodiment of the present invention.

FIG. 2 is a schematic block diagram of a security system 200 in accordance with an illustrative embodiment of the present invention. As used herein, a security system denotes a computer having features such as simplicity of security service management for users (system administrators) and clients of network attached storage (NAS) and storage area network (SAN) deployments. The security system comprises one or more processors, e.g., central processing units (CPU 220*a,b*), a memory 210, one or more network adapters 220*a, b*, a storage encryption processor (SEP 290) and a storage controller 230 interconnected by a system bus 240, such as a conventional Peripheral Component Inter-connect (PCI) bus. The SEP 290 is configured to perform all encryption and decryption operations for the security system in a secure manner; for example, the SEP is configured to protect plaintext encryption keys from system software executing on each CPU 202. Accordingly, the SEP is illustratively embodied as a FIPS certified module that is mounted onto a dedicated interface card or other similar card.

The network adapters 220 couple the security system 200 between one or more clients 102, one or more storage systems 110, a syslog module 140 and/or a vendor support system 150 over point-to-point links, wide area networks (WANs), virtual private networks (VPNs) implemented over a public network (Internet) or shared local area networks (LANs). In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the system 200 to, e.g., a FC network. In a NAS environment configured to support, e.g., the conventional Common Internet File System (CIFS) and the Network File System (NFS) data access protocols, the network adapters 220 may comprise network interface cards (NICs) having the mechanical, electrical and signaling circuitry needed to connect the system to, e.g., an Ethernet network.

The memory 210 illustratively comprises storage locations that are addressable by the processors and adapters for storing software programs and data structures associated with the present invention. The processor and adapters may, in turn, comprise processing elements and/or logic circuitry configured to execute the software programs and manipulate the data structures. An operating system 212, portions of which is typically resident in memory and executed by the processing elements, functionally organizes the security system 200 by, inter alia, invoking security operations in support of software processes and/or modules implemented by the system. Illustratively, the these software modules include a system log (syslog) module 255, an event router module 260, and an autosupport daemon module 265, although it should be understood that the modules may be embodied in hardware. Each of these illustrative software modules may be implemented as part of the operating system 212 executing on the security system in accordance with an illustrative embodiment of the present invention. However, in alternative embodiments, these software modules may be independent of the operating system 212 and may operate as, e.g., user mode applications on the security system 200. Furthermore, certain functionalities may be combined. For example, the functionality of the event router module 260 may be integrated into the syslog module 225. In alternative embodiments, the autosupport daemon module 265 may include the functionality of the event router module 260 and/or syslog module 255. As such, the descriptions of certain functionalities being performed by specific modules should be taken as exemplary only. It will be apparent to those skilled in the art that other processing and memory means, including various computer readable media, may be used for storing and executing program instructions pertaining to the invention described herein.

C. Autosupport

The present invention provides a system and method for providing autosupport functionality for one or more security systems in a network environment. By autosupport, it is generally meant the automatic notification of one or more individuals, including, e.g., system administrator and/or vendors, of an error condition or other event being generated by one or more modules of the security system. Automatic notification enables these administrator(s) and/or vendor(s) to identify a problem before it leads to a catastrophic failure of the system and/or data corruption/data loss. In operation, an event generator, which may be a software and/or hardware module executing on the security system, generates an event, e.g., an error condition. The event generator passes the generated event to a system log (syslog) module and marks the event as being associated with an autosupport facility of the syslog module. The syslog module then forwards the event to an event router, which, upon determining that the event is associated with the autosupport facility, forwards the event to an autosupport daemon as, e.g., an event notification. The autosupport daemon illustratively includes a plurality of slots in a queue for processing such event notifications. The autosupport daemon examines the current state of its queue and determines whether a free slot exists for the received event notification. Should no is free slot exist, the autosupport daemon processes, e.g., logs, the event with no further action being performed. However, should a free slot exists, the autosupport daemon invokes a child process to notify a pre-configured set of recipients of the event. The recipients may include a vendor support system, a system administrator, a pager alert, etc. Once the recipients have been notified, the child process terminates and the slot in the queue is freed.

Figure 3:
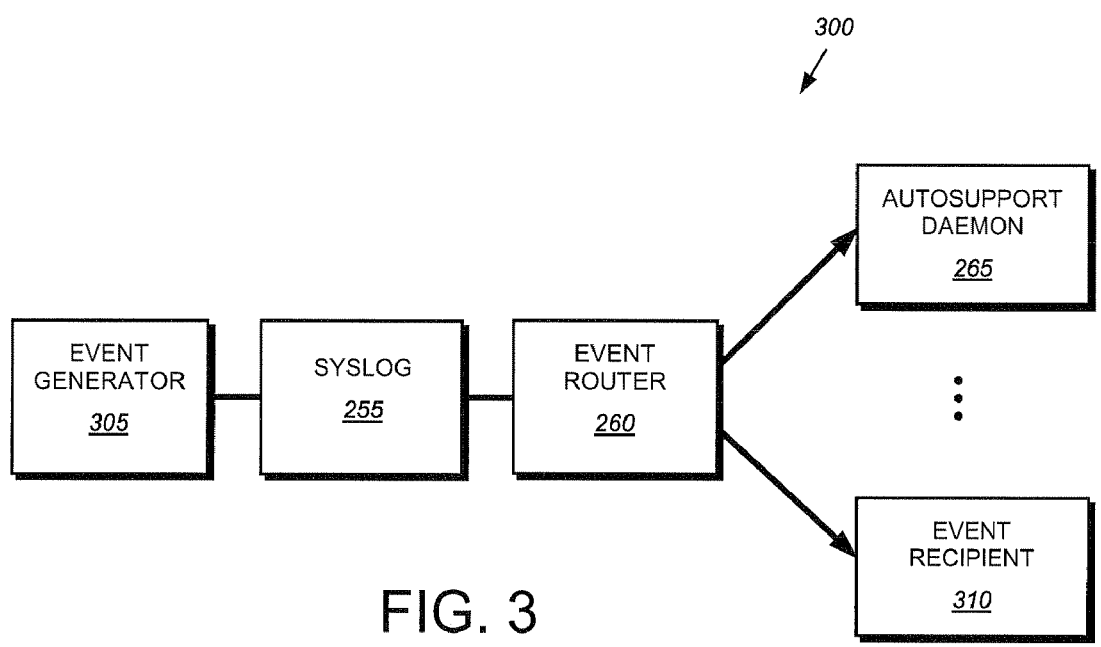
FIG. 3 is a schematic block diagram illustrating program flow among autosupport related modules in accordance with an illustrative embodiment of the present invention.

FIG. 3 is a schematic diagram of exemplary architecture flow 300 for providing autosupport functionality in accordance with an illustrative embodiment of the present invention. One or more event generators 305 generate events that are passed to the syslog module 255. Illustratively, the syslog module 255 supports a plurality of facilities to which event messages may be directed. The term facility refers, generally, to a class of messages that may be forwarded to the syslog module. The syslog module may be configurable to process received event messages differently based on the facility to which the event message is directed. In accordance with an illustrative embodiment of the present invention, one of the facilities is associated with autosupport events. Thus, in the illustrative embodiment, event generators associate events with the autosupport facility of the syslog module 255.

As noted, an event generator may comprise various software and/or hardware modules executing within the security system. For example, a network protocol stack of a operating system 112 may identify an error condition and generate an event signifying the error condition. This event may occur due to, for example, a cable being unplugged from a network card, thereby causing a loss of connectivity. It should be noted that any of the software and/or hardware modules executing within the security system may be an event generator. As such, the description of a protocol stack being an event generator should be taken as exemplary only. The event generator may pass the event to the syslog module 255 using, for example, a conventional local procedure call (LPC) between the module and the syslog module 255. Alternatively, the event generator may pass the event to the syslog module using any form of interprocess communication. As such, the description of a LPC should be taken as exemplary only.

The syslog module 255 then identifies that the generated event was directed to the autosupport facility and passes the event to the event router module 260 to determine the ultimate destination of the event. The event router 260 passes autosupport messages to the autosupport daemon 265 if it determines that the event is direct to the autosupport facility. Messages not relating to autosupport functionality may be passed to other event recipients 310. For example, certain event generators may generate a logging event when, for example, a password or other configuring configuration information is modified, so that the configuration modification is logged. Such events may be logged so that the event recipient is a conventional system log (syslog) process. Alternatively, the event recipient may comprise other modules configured to perform other, i.e., non autosupport, operations.

Figure 4:
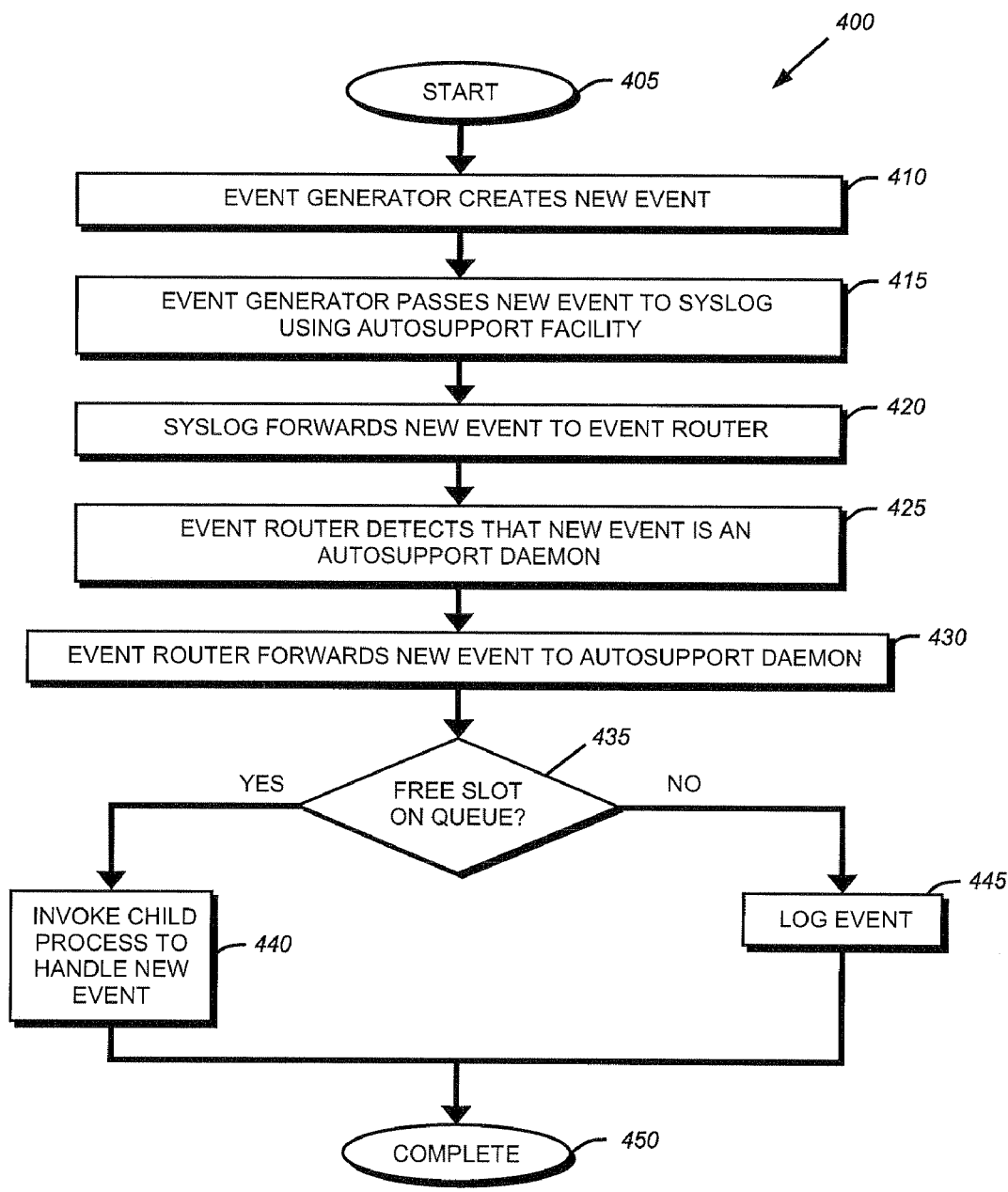
FIG. 4 is a flowchart detailing the steps of a procedure for providing autosupport functionality in accordance with an illustrative embodiment of the present invention.

FIG. 4 is a flowchart detailing the steps of a procedure 400 for implementing auto support functionality in accordance with an illustrative embodiment of the present invention. The procedure 400 begins in step 405 and continues to step 410 where an event generator creates a new event. As noted above, any hardware and/or software module of the security system may comprise an event generator. Then, in step 415, the event generator passes the new event to the syslog using the autosupport facility of the syslog. The syslog then forwards the new event to the event router in step 420. The event router detects that the new event is an auto support event. Illustratively, this may be performed by examining the facility to which the message was directed. The event router then forwards the new event to the autosupport daemon in step 430. The autosupport daemon determines, in step 435, whether a free slot exists on its queue. Illustratively the autosupport daemon contains a fixed number of queues for handling autosupport messages. If a free slot exists, the procedure branches to step 440 where a child process is invoked to handle the new event. It should be noted that while the present invention is written in terms of child processes, other techniques may be utilized in place of child processes in accordance with alternative embodiments of the present invention. Thus, the description of a child process should be taken as exemplary only. The child process illustratively notifies a preconfigured set of recipients of the event. A system administrator may configure a set of recipients for each type of event message that may be generated. Alternatively, a system administrator may configure a set of recipients for certain classes of events and/or for certain seriousness levels of messages. Examples of recipients include a system administrator, who may be notified via email, a console message, etc., a pager number, a vendor support system, etc.

However, if, in step 435, it is determined that no free slot exists on the queue, the procedure branches to step 445 where the event is processed, e.g., logged. Illustratively, logging may comprise, e.g., a conventional syslog logging operation such as appending a log message to one or more system log files. The procedure 400 then completes in step 450.

The foregoing description has been directed to specific embodiments of this invention. It will be apparent, however, that other variations and modifications may be made to the described embodiments, with the attainment of some or all of their advantages. For instance, it is expressly contemplated that the procedures, processes, layers and/or modules described herein may be implemented in hardware, software, embodied as a computer-readable medium having executable program instructions, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for providing autosupport functionality to a security system, the method comprising:
    generating, by an event generator, an event indicating an error condition;
    passing, by the event generator, the event to an event router executing on the security system identifying that the event is associated with an autosupport facility;
    routing, by the event router, the event to an autosupport module executing on the security system, wherein the event is not logged into a system log prior to being routed to the autosupport module;
    determining, by the autosupport module, if a free queue of a plurality of queues is available to process the event;
    in response to determining that the free queue of the plurality of queues is available to process the event, utilizing the free queue of the plurality of queues to process the event; and
    logging the event in response to determining that the event is unable to be processed.

2. The method of claim 1 wherein processing the event comprises transmitting a message to at least one recipient.

3. The method of claim 2 wherein the at least one recipient comprises a vendor support system.

4. The method of claim 1 further comprising passing the event to a system log module external to the security system.

5. The method of claim 1 further comprising passing the event to a system log module executing on the security system.

6. The method of claim 1 wherein the event identifies the error condition.

7. The method of claim 6 wherein the error condition comprises a misconfiguration of the security system.

8. The method of claim 1 wherein determining that the event is unable to be processed further comprises: determining that the free queue of the plurality of queues is not available to process the event.

9. The method of claim 1 wherein processing the event comprises sending an alert to an administrator.

10. A non-transitory computer readable medium containing executable program instructions executed by a processor, comprising:
    program instructions that generate an event indicating an error condition associated with a security system;
    program instructions that pass the event to an event router executing on the security system identifying that the event is associated with an autosupport facility;
    program instructions that route the event to an autosupport module executing on the security system;
    program instructions that determine if a free queue of a plurality of queues is available to process the event;
    program instructions that process the event utilizing the free queue in response to determining that the free queue of the plurality of queues is available to process the event; and
    program instructions that log the event in response to determining that the free queue of the plurality of queues is not available to process the event.

11. The computer readable medium of claim 10 further comprising program instructions that transmit a message to one or more recipients.

12. A system for providing autosupport functionality to a computer, the system comprising:
    one or more event generators configured to transmit an event message to a system log module, the system log module configured to pass, without logging the event message in a log file, the event message to an event router configured to detect a type of event message and in response to detecting that the type of event message is an autosupport type, forward the event message to an autosupport daemon, that comprises a plurality of queues, for processing, wherein the event message is logged in the log file if the event message cannot be processed by the autosupport daemon, wherein the autosupport daemon is configure to determine whether a free queue of the plurality of queues exists, and is further configured, in response to determining that the free queue exists, to launch a child process to process the event message.

13. The system of claim 12 wherein the child process is configured to send an electronic mail message to one or more predefined recipients.

14. The system of claim 12 wherein the child process is configured to page one or more recipients.

15. The system of claim 12 wherein the one or more event generators are further configured to associate the event message with an autosupport facility of the system log module.

16. The system of claim 12 wherein the system log module comprises the event router.

17. The system of claim 12 wherein the autosupport daemon is configured to log the event in a system log.

18. A method for providing autosupport functionality to a computer, the method comprising:
    detecting, by an event generator, an occurrence of an error condition associated with the computer;
    generating an event identifying the detected error condition;
    passing the event to an event router identifying that the event is associated with an autosupport facility;
    in response to determining that the event is associated with the autosupport facility, routing, by the event router, the event to an autosupport module without logging the event in a log file;
    determining, by the autosupport module, whether a resource is free for processing the event;
    in response to determining that the resource is not free, logging the event; and
    in response to determining that the resource is free, processing, using the free resource, the event.

\* \* \* \* \*